(12) United States Patent
Drozhilkin et al.

(10) Patent No.: US 11,381,681 B2
(45) Date of Patent: Jul. 5, 2022

(54) SYSTEM AND METHOD FOR PROVIDING VOICE COMMUNICATION SESSIONS BETWEEN COMMUNICATION DEVICES

(71) Applicant: Echo SmartLab GmbH, Kusnacht (CH)

(72) Inventors: Sergei Vladimirovich Drozhilkin, Kuesnacht (CH); Vladimir Ponomarev, Monaco (MC); Nikolay Nikolaevich Mikhaylov, Nizhny Novgorod (RU)

(73) Assignee: Echo SmartLab GmbH, Kusnacht (CH)

(*) Notice: Subject to any disclaimer, the term of this patent is extended or adjusted under 35 U.S.C. 154(b) by 50 days.

(21) Appl. No.: 17/069,395

(22) Filed: Oct. 13, 2020

(65) Prior Publication Data
US 2022/0116499 A1 Apr. 14, 2022

(51) Int. Cl.
*H04M 3/436* (2006.01)
*H04M 3/424* (2006.01)
*H04L 65/1069* (2022.01)
*H04L 65/10* (2022.01)

(52) U.S. Cl.
CPC ...... *H04M 3/4365* (2013.01); *H04L 65/1013* (2013.01); *H04L 65/1069* (2013.01); *H04M 3/424* (2013.01)

(58) Field of Classification Search
USPC ........................................................ 455/415
See application file for complete search history.

(56) References Cited

U.S. PATENT DOCUMENTS

| | | | |
|---|---|---|---|
| 9,680,883 B1 | 6/2017 | Kashimba et al. | |
| 9,781,240 B2 | 10/2017 | Lee et al. | |
| 10,074,369 B2 | 9/2018 | Devaraj et al. | |
| 10,154,145 B1 | 12/2018 | Kashimba et al. | |
| 10,235,129 B1* | 3/2019 | Carlson | G10L 15/22 |
| 10,349,006 B2 | 7/2019 | Baldwin | |
| 10,574,707 B1 | 2/2020 | Norquist et al. | |
| 2018/0061402 A1* | 3/2018 | Devaraj | G10L 15/22 |

FOREIGN PATENT DOCUMENTS

| | | |
|---|---|---|
| CN | 111028837 A | 4/2020 |
| EP | 2063600 A1 | 5/2009 |
| GB | 2578121 A | 4/2020 |
| WO | 2014178860 A1 | 11/2014 |

* cited by examiner

*Primary Examiner* — Amal S Zenati
(74) *Attorney, Agent, or Firm* — Browdy and Neimark, P.L.L.C.

(57) ABSTRACT

A system and method for providing a call session in a communication environment between a caller communication device associated with a caller user and a recipient communication device associated with a recipient user are described. The system includes an automated call controller adapted for being coupled to the caller and recipient communication devices. In operation, a caller user utters a call initiation phrase in a natural language into his communication device. The system analyses the call initiation phrase, finds the recipient device in the communication environment, transmits and plays back the call initiation phrase on the recipient communication device. The system receives and analyzes a recipient reaction to recognize the recipient user intention either to accept or reject the call session, and establishes the call session between the communicating caller and recipient users.

29 Claims, 5 Drawing Sheets

SYSTEM AND METHOD FOR PROVIDING VOICE COMMUNICATION SESSIONS BETWEEN COMMUNICATION DEVICES

TECHNOLOGICAL FIELD

This invention relates to the field of communication systems, and in particular to a system and method for operating personal devices providing voice communication between users over communication networks.

BACKGROUND

Voice communication systems make it possible to connect people everywhere. Recently, the traditional Public Switched Telephone Networks of the past are usually replaced worldwide by modern mobile and Voice over Internet Protocol (VoIP) communication systems, also called IP telephony, that leverage global communication networks. Wireless communication devices, such as mobile phones, have become almost indispensable for people on the road, at home and at work.

Referring to FIG. 1, a simplified schematic block diagram of conventional voice communication system 10 is illustrated. In such telephone systems (both mobile cellular systems and stationary PSTN), in order for a caller user 11 to initiate a voice communication with a recipient user 12, the caller needs to dial (i.e., to enter) a phone number of the communication device of the target recipient user 14, so as to provide the phone number to the call switching system 15 of the voice communication system. The call switching system 15 finds the communication device of the target recipient user 14 within the communication network and invites the recipient user 14 to participate in the voice communication session by ringing via the communication device of the recipient user 14.

From the user experience perspective, such a conventional manner of initiation of voice communication lacks convenience and user friendliness, because it differs from the natural way of face-to-face communication between people. Indeed, in conventional voice communication systems there is a need for users to deal with phone numbers or other contact data of the recipients. They need to store phone numbers in a contact list on their communication devices, or even remember them and then enter the communication system when making a telephone call. At the same time, in natural live communication, when people physically meet with each other face to face, they just start conversation, talking to each other directly, without any phone numbers and preliminary actions, which is the most natural and intuitive way of communication initiation that conventional voice communication systems lack today.

GENERAL DESCRIPTION

There is a need in the art to provide a system for providing voice communication sessions between one communication device associated with a caller user, and another communication device associated with a recipient user in a communication environment, so that the system may provide a communication session, but at the same time, be user friendly, and be easily used by people of all ages, conditions, and technical experience.

It would be beneficial to have a communication system which can provide automated voice communication assistance to users of communication devices in a convenient, natural and intuitive way for initiating voice communications.

The present application partially eliminates limitations and inconveniences of conventional telephone systems and methods for providing voice communication sessions between communication devices.

In the present description and in the claims, the terms "voice communication session" and "call session" both refer to a predetermined voice communication dialogue between the caller and recipient users of the corresponding communication devices. Accordingly, these terms are used hereinbelow interchangeably.

Moreover, the communication device of the caller user is also referred to as the "caller communication device", and is also referred to as the "first communication device". In turn, the communication device of the recipient user is also referred to as the "recipient communication device" and is also referred to as the "second communication device". It should be understood that the same user of the communication device can be either a caller user (when he/she initiates a call) or a recipient user (when he/she receives the call).

According to an embodiment, in order to initiate a voice communication, a caller user starts a voice conversation with a remote recipient user, by using his caller communication device, without any preliminary actions, in the same natural manner as if the recipient is located nearby, at arm's distance. In turn, the system automatically handles all actions and requirements which are necessary for establishment of a remote full-duplex voice communication session between the communicating caller and recipient users. The communication devices of the caller and recipient users can, for example, be personal communication devices, such as personal desktop and laptop computers, mobile phones, walkie-talkie handheld transceivers, personal wearable communication devices, etc.

It should be noted that such a manner of initiation of voice communication is socially acceptable mostly for the users who are in close and informal relationships with each other. Thus, the system for providing voice communication sessions according to the embodiments of the present invention can be mostly useful and applicable to users who are in close informal relationships with each other, e.g. friends, family members, relatives, and other categories of users. However, it should be understood that such a communication system can also be applicable to other categories of users. For example, the system for providing voice communication sessions according to the embodiments of the present invention could be used in hospitals for fast and convenient voice communication between patients and their physicians and nurses. Another example of application of the system includes, but is not limited to, logistics hubs, such as airports, marine ports, warehouses, etc. In these applications, the system can be helpful for convenient coordination of communications of the working personnel.

In operation, according to an embodiment of the present invention, a caller user utters a call initiation phrase in a natural language into his communication device. The call initiation phrase is intended for playing back to the recipient user with whom the caller wishes to establish voice communication. The system analyses the uttered call initiation phrase and identifies it as a kind of a signal that is used for an attempt to initiate a voice communication session between the caller and the target recipient. The system then creates an end-to-end connection from the caller communication device to the recipient communication device and transmits this call initiation phrase to the recipient site. The call initiation phrase is played back on the recipient communication device.

According to an embodiment, one or more words of the call initiation phrase are required to be indicative of a personal characteristic of the recipient user. For example, the call initiation phrase can include at least one of the words pointing to the personality of the recipient user, e.g., recipient's official name, nickname or an alias word by which the recipient user can be identified as a contact of the caller by the system.

It should be noted that a call initiation phrase can, for example, be any phrase or a sequence of several phrases that a caller user may say to the recipient user to start a conversation, pointing to the recipient user personality that is included in this phrase. As a non-limiting example, if a caller user named Alice wishes to start a voice communication with a recipient user named Bob, the call initiation phrase can, for example, be as follows: "Hi Bob, can you talk to me now?" or "Bob, when will you be done today?". Alternatively, many other informal phrases can be used that include the recipient user personality "Bob".

According to an embodiment of the present invention, the recipient user, in turn, may respond to the call initiation phrase, for example, by uttering a recipient user response phrase, which is intended for playing back on the communication device of the caller user. The recipient user response phrase is semantically indicative of whether the recipient user accepts or rejects the proposed voice communication at the given moment.

Thus, in response to Alice's call initiation phrase of the examples above, the recipient user Bob can for example, say: "Sure, let's talk" or "In two hours, I guess" respectively, when the recipient user intends to accept the call invitations. Alternatively, if the recipient user intends to reject the proposed voice communication, he can, for example, but not limited by this example, reply: "Reject", "Cancel", etc.

The system analyses the uttered recipient user response phrase and recognizes the semantic indication of the recipient intention to accept or reject the proposal of the caller user to start a conversation. Depending on the semantic indication, the system can either establish or reject voice communication between the caller and recipient users.

In particular, if the uttered recipient user response phrase is indicative of acceptance of the voice communication, the system establishes a full-duplex voice communication session between the caller and the recipient, and transmits the recipient user response phrase to the caller side of the system, where the recipient user response phrase is played back on the caller communication device.

As indicated above, the word(s) of the call initiation phrase which is (are) indicative of a personality of the recipient user, can trigger creation of the end-to-end connection from the caller communication device to the recipient communication device. This end-to-end connection allows for the other passages uttered by the caller user, which follow the initial call initiation phrase, to be transmitted by the system to the recipient user automatically. These passages do not need to be indicative of the recipient user personality, since the recipient user is already suggested by the context of the initiation phrase.

On the other hand, if the uttered recipient user response phrase is semantically indicative of rejection of the voice communication, the system cancels the procedure of establishment of the voice communication session, and returns to the initial state, which was before the call initiation phrase was uttered by the caller user. In this case, the recipient user response phrase may not be transmitted to the caller user.

According to an embodiment of the present invention, any types of recipient user actions by using his communication device, which are indicative of acceptance or rejection of the voice communication, can be utilized by the system as a trigger for establishment or rejection of a full-duplex voice communication session between the caller and the recipient users. For example, such types of the recipient user actions as pressing a control button of the communication device in a predetermined action pattern (e.g., pressing the control button once, twice, etc., and/or physically shaking the device by the recipient user in a predetermined manner) can be utilized by the system as indication of the recipient's intention to accept or to reject the initiation of a voice communication between the caller and recipient users.

According to an embodiment of the present invention, termination of the established call sessions within the system can be triggered by any kind of system user activities resulting in generation of call termination signals indicative of termination of the call session. The call termination signals can be originated either by the recipient user by using his communication device, or by the caller user by using the caller communication device.

Thus, according to a general aspect of the present invention, a novel system for providing a call session between one communication device associated with a caller user, and another communication device associated with a recipient user, is described. The first communication device has first device coordinates in the communication environment and the second communication device has second device coordinates in the communication environment.

According to some embodiments of the present invention, the system for providing a call session includes an automated call controller adapted for being coupled to the first communication device via a first communication link and to the second communication device via a second communication link.

According to some embodiments of the present invention, in the forward direction from the first communication device to the second communication device, the automated call controller is configured to couple the first communication device to the automated call controller via the first communication link for receiving a call initiation audio signal from the first communication device via the first communication link.

According to an embodiment of the present invention, the call initiation audio signal is indicative of a call initiation phrase uttered by the caller user. The call initiation phrase is indicative of the caller user's intention to establish the call session. The call initiation phrase includes one or more personality characteristics of the recipient user.

According to some embodiments of the present invention, in the forward direction from the first communication device to the second communication device, the automated call controller is also configured to analyze the call initiation phrase for determining at least one personality characteristic of the recipient user. The automated call controller is also configured to find the second device coordinates of the second communication device in the communication environment by using the personality characteristic of the recipient user. The automated call controller is also configured to couple the second communication device to the automated call controller via the second communication link by using the second device coordinates. The automated call controller is also configured to transmit the call initiation audio signal to the second communication device via the second communication link.

According to some embodiments of the present invention, in a backward direction from the second communication device to first communication device, the automated call controller is configured to receive a recipient user reaction signal from the second communication device provided by the recipient user in response to the call initiation audio signal. The recipient user reaction signal is indicative of a recipient user intention that can be either a recipient acceptance intention, when the recipient user intends to accept the call and start a voice communication with the caller user, or a recipient rejection intention of the call session, when the recipient user intends to decline the invitation of the caller user.

The automated call controller is also configured to analyze the recipient user reaction signal in order to determine indication of the recipient user's intention, and, if the recipient user intention is the recipient acceptance intention of the call session, to establish a full-duplex call session between the first and the second communication devices, and to exchange audio signals between the first and second communication devices during the established call session. The recipient user reaction signal is selected from a recipient response audio signal and a recipient response action signal.

According to an embodiment of the present invention, the recipient response audio signal is indicative of a recipient user response phrase. The recipient user response phrase is indicative of the recipient user intention either to accept the call session or to reject the call session.

According to some embodiments of the present invention, the automated call controller includes a first communication interface adapted for being coupled to the first communication device via the first communication link, a second communication interface adapted for being coupled to the second communication device via the second communication link, and a voice signal dispatcher coupled to the first communication interface and to the second communication interface. The automated call controller also includes a voice utterance interpreter coupled to the first communication interface, and to the second communication interface. The automated call controller also includes a voice communication controller coupled to the voice utterance interpreter, to the voice signal dispatcher, to the first communication interface, and to the second communication interface. The automated call controller also includes a user registry coupled to the voice communication controller.

According to an embodiment of the present invention, for establishing voice communication between the first and second communication devices, the first communication interface is configured, in the forward direction, to couple the first communication device to the automated call controller via the first communication link, and to receive the call initiation audio signal provided by the caller user via the first communication link. The first communication interface is also configured to forward the call initiation audio signal to the voice signal dispatcher and to the voice utterance interpreter. The first communication interface is also configured to exchange audio signals between the voice signal dispatcher and the first communication device during the call session. The audio signals are generated during a voice communication of the caller user and the recipient user.

According to an embodiment of the present invention, the second communication interface is configured, in the forward direction, to receive the call initiation audio signal from the voice signal dispatcher, and to forward the call initiation audio signal to the second communication device via the second communication link. The second communication interface is also configured to exchange audio signals between the voice signal dispatcher and the second communication device during the call session. Such audio signals are generated during the voice communication of the caller user and the recipient user.

In operation, the forwarding of the call initiation audio signal by the second communication interface to the second communication device includes receiving the call initiation audio signal from the voice signal dispatcher, and receiving a transmission command signal from the voice communication controller. It should be noted that the transmission command signal is indicative of the second device coordinates of the second communication device. Then, the second communication device is coupled to the second communication interface via the second communication link by using the second device coordinates. After the coupling, the call initiation audio signal is transmitted to the second communication device via the second communication link.

According to an embodiment of the present invention, the voice signal dispatcher is configured for exchanging the audio signals between the first communication interface and the second communication interface.

According to an embodiment of the present invention, the exchanging of the audio signals provided by the voice signal dispatcher between the first communication interface and the second communication interface, in the forward direction from the first communication interface to the second communication interface, includes receiving the audio signal from the first communication interface, buffering the received audio signal, and forwarding the buffered audio signal to the second communication interface.

According to an embodiment of the present invention, the exchanging of the audio signals provided by the voice signal dispatcher between the first communication interface and the second communication interface, in the backward direction from the second communication interface to the first communication interface, includes receiving the audio signal from the second communication interface, buffering the received audio signal, and forwarding the buffered audio signal to the first communication interface.

According to an embodiment of the present invention, the voice utterance interpreter is configured to analyze the call initiation audio signal in order to determine the call initiation phrase, so as to determine the caller user intention to establish the call session. The voice utterance interpreter is also configured to determine the at least one personality characteristic of the recipient user from the call initiation phrase.

The voice utterance interpreter is also configured to generate caller user intention data that includes the personality characteristic of the recipient user, and to relay the caller user intention data to the voice communication controller. It should be noted that in the present description and in the claims, the phrases "to relay to" and "to forward to" are used interchangeably.

According to an embodiment of the present invention, the voice utterance interpreter is further configured to analyze the recipient response audio signal in order to recognize the recipient user intention, which can be either a recipient acceptance intention or the recipient rejection intention of the call session.

The voice utterance interpreter is also configured to generate recipient user intention data indicative of the recipient user intention, and to provide the recipient user intention data to the voice communication controller.

According to an embodiment of the present invention, the voice communication controller is configured for establishing full-duplex call sessions between the first and the second communication devices.

According to an embodiment of the present invention, the user registry is configured for storing a contact list of the caller user. The contact list includes a set of recipient user records. Each recipient user record includes data of the recipient user including recipient user personality characteristics, and coordinates of a corresponding communication device of the recipient user within the communication environment. The set of recipient user records includes all potential recipient users of the system associated with the caller user. The user registry is also configured for transmitting the data of the recipient user record from the contact list to the voice communication controller upon receipt of a corresponding request from the voice communication controller.

As described above, the recipient user reaction signal provided by the recipient user, in response to the call initiation audio signal originated from the caller user, can be either the recipient response audio signal or the recipient response action signal.

According to an embodiment of the present invention, the second communication interface is further configured, in the backward direction from the second communication device to the first communication device, to receive the recipient response audio signal from the second communication link, and then to forward the recipient response audio signal to the voice signal dispatcher and to the voice utterance interpreter. It should be noted that the recipient response audio signal is provided by the second communication device and originated from the recipient user.

In turn, in the backward direction (i.e. from the second communication device to the first communication device), the first communication interface is also configured to receive the recipient response audio signal from the voice signal dispatcher. The first communication interface is also configured to forward the recipient response audio signal to the first communication device via the first communication link.

In operation, in the backward direction, the forwarding of the recipient response audio signal by the first communication interface to the first communication device, includes receiving the recipient response audio signal from the voice signal dispatcher, and receiving a transmission command signal from the voice communication controller. It should be noted that the transmission command signal is associated with the established call session between the first communication device and the second communication device. The forwarding of the recipient response audio signal by the first communication interface to the first communication device also includes transmitting the recipient response audio signal to the first communication device via the first communication link.

According to an embodiment of the present invention, the recipient response action signal is indicative of a recipient user action pattern. The recipient user action pattern is indicative of a recipient user intention. The recipient user intention is selected from a recipient acceptance intention and a recipient rejection intention of the call session.

According to an embodiment of the present invention, in the backward direction from the second communication device to the first communication device, the second communication interface is further configured for receiving the recipient response action signal from the second communication device via the second communication link, and forwarding the received recipient response action signal to the voice communication controller.

According to an embodiment of the present invention, in order to terminate the full-duplex call session established between the first and second communication devices, the first communication interface is configured for receiving a call termination signal from the first communication device via the first communication link, and forwarding the received call termination signal to the voice communication controller. It should be noted that the call termination signal is indicative of an intention of the caller user to terminate an established full-duplex call session between the first and the second communication devices.

According to an embodiment of the present invention, the voice communication controller is also configured for generating a decoupling signal and for providing the decoupling signal to the second communication interface.

According to an embodiment of the present invention, the second communication interface is further configured for disconnecting the second communication link, thereby decoupling the second communication device from the automated call controller, in response to the decoupling signal.

According to an embodiment of the present invention, the voice communication controller is further configured for generating a resetting signal and for providing the resetting signal to the voice signal dispatcher. In turn, the voice signal dispatcher is responsive to the resetting signal, and is configured to delete all buffered audio signals.

According to an embodiment of the present invention, in order to terminate the full-duplex call session established between the first and second communication devices, the second communication interface is further configured for receiving a call termination signal from the second communication device via the second communication link, and forwarding the received call termination signal to the voice communication controller. It should be noted that the call termination signal is indicative of an intention of the recipient user to terminate an established full-duplex call session between the first and the second communication devices.

According to an embodiment of the present invention, the voice communication controller is further configured for generating a decoupling signal and for providing the decoupling signal to the second communication interface.

According to an embodiment of the present invention, the second communication interface is also configured for disconnecting the second communication link, thereby decoupling the second communication device from the automated call controller in response to the decoupling signal.

According to an embodiment of the present invention, the voice communication controller is further configured for generating a resetting signal and for providing the resetting signal to the voice signal dispatcher. The voice signal dispatcher is responsive to the resetting signal to delete all buffered audio signals.

According to another embodiment of the present invention, the first communication interface is further configured for receiving a system activation signal followed by the call initiation audio signal provided by the first communication device via the first communication link, forwarding the received system activation signal to the voice communication controller, and forwarding the received call initiation audio signal to the voice utterance interpreter and to the voice signal dispatcher. The voice communication controller is responsive to the system activation signal to generate an utterance analyzing instruction signal and to provide the utterance analyzing instruction signal to the voice utterance interpreter, thereby instructing the voice utterance interpreter to begin analyzing the call initiation audio signal. The voice utterance interpreter is responsive to the utterance analyzing instruction signal to begin analyzing the call initiation audio signal followed by the system activation signal.

According to another general aspect of the present invention, there is disclosed a method for providing a call session between a first communication device associated with a caller user and a second communication device associated with a recipient user in a communication environment. The method is based on the system described above, which is deployed for providing the call session.

According to an embodiment of the present invention, in a forward direction from the first communication device to the second communication device, the method starts from the step of coupling the first communication device to the automated call controller via the first communication link. The method further includes receiving a call initiation audio signal from the first communication device by the automated call controller.

According to an embodiment, the receiving of the call initiation audio signal from the first communication device by the automated call controller includes buffering a copy of the call initiation audio signal in the voice signal dispatcher. The method for providing a call session further includes analyzing the call initiation audio signal in order to determine one or more personality characteristics of the recipient user.

According to an embodiment, the method for the providing of a call session further includes finding the second device coordinates of the second communication device in the communication environment by using the personality characteristic(s) of the recipient user. According to an embodiment, the finding of the second device coordinates of the second communication device includes: finding a corresponding recipient user record within the contact list by using the personality characteristic(s) of the recipient user as a search parameter, and extracting the second device coordinates of the corresponding second communication device of the recipient user within the communication environment from the recipient user record.

According to an embodiment of the present invention, the method for the providing of a call session further includes coupling the automated call controller to the second communication device via the second communication link by using the second device coordinates of the second communication device, and forwarding the call initiation audio signal to the second communication device.

According to an embodiment of the present invention, the method for the providing of a call session, in a backward direction from the second communication device to the first communication device, includes receiving a recipient user reaction signal from the second communication device by the automated call controller in response to the call initiation audio signal. The recipient user reaction signal is indicative of a recipient user intention that is selected from recipient acceptance intention and recipient rejection intention of the call session.

According to some embodiments, the recipient user reaction signal is selected from a recipient response audio signal and a recipient response action signal.

Thus, according to one embodiment, the recipient user reaction signal is the recipient response audio signal that is indicative of at least one recipient user response phrase that is indicative of the recipient user intention to accept the call session, or to reject the call session.

According to an embodiment, in the backward direction from the second communication device to the first communication device, the receiving of the recipient response audio signal from the second communication device includes buffering a copy of the recipient response audio signal in the voice signal dispatcher.

According to an embodiment, the method for providing a call session, in a backward direction from the second communication device to the first communication device, also includes analyzing the recipient user reaction signal to determine indication of the recipient user intention.

Accordingly, if the recipient user intention is determined as an acceptance of the call session, then a full-duplex call session between the first and the second communication devices is established and exchange of audio signals between the first and the second communication devices is provided during the established call session. The audio signals are generated during the voice communication of the caller user and the recipient user.

Alternatively, if the recipient user intention is determined as a rejection of the call session, the method, according to some embodiments, includes canceling a procedure of establishment of the full-duplex call session between the first and the second communication devices.

According to an embodiment of the present invention, the canceling of the full-duplex call session includes decoupling the second communication device from the automated call controller by disconnecting the second communication link. After disconnection of the second communication link, the recipient user reaction signal can be deleted.

According to another embodiment, the recipient user reaction signal is a recipient response action signal that is indicative of recipient user action pattern. The recipient user action pattern is indicative of a recipient user intention either to accept the call session, or to reject the call session.

According to an embodiment of the present invention, any types of recipient user actions by using his communication device, which are indicative of acceptance or rejection of the voice communication, can be utilized by the system as a trigger for establishment or rejection of a full-duplex call session between the caller and the recipient users. For example, such a pattern of the recipient user actions as pressing a control button of the communication device in a predetermined action pattern (e.g., pressing the control button once, twice, etc., and/or physically shaking the device by the recipient user in a predetermined manner) can be utilized by the system as indication of the recipient's intention either to accept or to reject the initiation of a voice communication between the caller and recipient users.

It should be understood that either the caller user or a recipient user may terminate the full-duplex call session that was established between the first and the second communication devices.

Accordingly, terminating the full-duplex call session by the caller user includes receiving a call termination signal from the first communication device via the first communication link. The call termination signal is indicative of the intention of the caller user to terminate the full-duplex call session established between the first and second communication devices.

Accordingly, in response to the call termination signal, the method includes terminating the established full-duplex call session. According to an embodiment, the terminating includes interrupting exchange of the audio signals between the first communication device and the second communication device, and decoupling the second communication device from the automated call controller by disconnecting the second communication link.

Likewise, terminating the full-duplex call session by the recipient user includes receiving a call termination signal from the second communication device via the second communication link. The call termination signal is indicative of the intention of the recipient user to terminate the full-duplex call session established between the first and second communication devices.

In response to the call termination signal, terminating the established full-duplex call session includes interrupting exchange of the audio signals between the first communication device and the second communication device, and decoupling the second communication device from the automated call controller by disconnecting the second communication link.

The system and method in accordance with embodiments of the given invention may be applied to any currently available and possible future voice communication technologies and systems, including mobile smartphones (no matter whether are they based on Google Android OS or Apple iOS or any other operating system), walkie-talkie handheld transceivers, personal wearable communication devices, voice communication applications such as Skype, Zoom, Viber, Telegram, WhatsApp, and so on.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
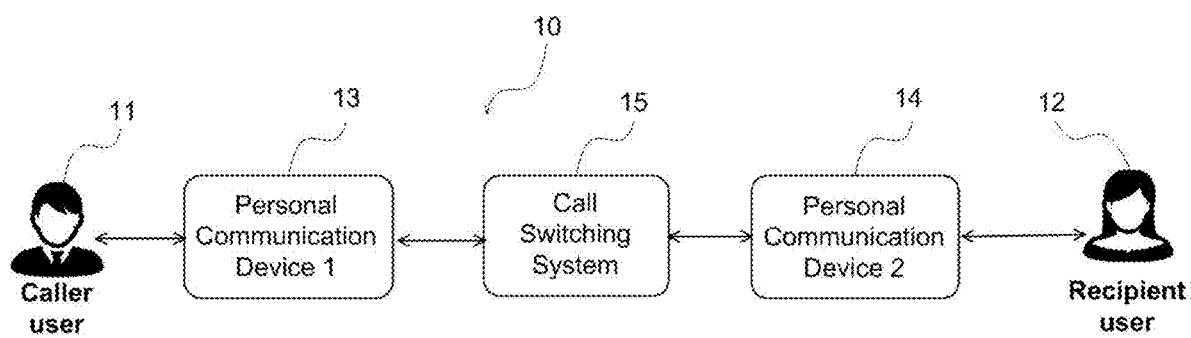
FIG. 1 illustrates a simplified schematic block diagram of a conventional voice communication system.

The principles and operation of the system and method for providing call sessions between one communication device associated with a caller user and another communication device associated with a recipient user, according to the present invention may be better understood with reference to the drawings and the accompanying description, it being understood that these drawings and examples in the description are given for illustrative purposes only and are not meant to be limiting. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

System, device and method components have been represented, where appropriate, by conventional symbols in the drawings, showing only those specific details that are pertinent to understanding the various embodiments, so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment, may not be depicted in order to facilitate a less obstructed view of these various embodiments.

The same reference numerals and alphabetic characters will be utilized for identifying those components which are common in the tracking system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow herein below, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

The present application provides a novel voice communication technique for providing call sessions in a communication environment between one communication device associated with a caller user and another communication device associated with a recipient user. In the present description, the term "communication environment" is referred to a combination of various communication networks and radio channels in some radio frequency allocations that enable exchange of communication signals between the caller communication device and the recipient communication device.

In order to initiate a voice communication, a caller user, by using his communication device, starts a voice conversation with a remote recipient user via the communication device of the recipient user. The voice conversation may start without any preliminary actions, i.e., in the same natural manner, as if the recipient is located near the caller, at arm's distance. In turn, the system automatically handles all actions and requirements which are necessary for establishment of a full-duplex voice communication session between the communicating caller and recipient users. The communication devices of the caller and recipient users can, for example, be personal communication devices, such as personal desktop and laptop computers, mobile phones, walkie-talkie handheld transceivers, personal wearable communication devices, etc.

It should be noted that such a manner of initiation of voice communication is socially acceptable mostly for the users who are in close and informal relationships with each other. Thus, the system for providing voice communication sessions according to the embodiments of the present invention can be mostly useful and applicable to users who are in close informal relationships with each other, e.g. friends, family members, relatives and other categories of users. However, it should be understood that such a communication system can also be applicable to other categories of users. For example, the system for providing voice communication sessions according to the embodiments of the present invention could be applied in hospitals for fast and convenient voice communications between patients and their physicians and nurses. Another example of application of the system includes, but is not limited to, logistics hubs, such as airports, marine ports, warehouses, etc. In these applications, the system can be helpful for convenient coordination of communications of the working personnel.

In operation, according to an embodiment of the present invention, when the caller user starts a voice conversation, he/she utters a call initiation phrase, in a natural language into his/her communication device. In the present description and in the claims, the communication device of the caller user is also referred to as the "caller communication device" and is also referred to as the "first communication device". The call initiation phrase is indicative of the caller intention to establish a voice communication session with the recipient. The call initiation phrase is intended for playing back by recipient's communication device to the recipient user with whom the caller wishes to establish a voice communication. In the present description and in the claims, the communication device of the recipient user is also referred to as the "recipient communication device" and is also referred to as the "second communication device". It should be understood that the same user of the communication device can be either a caller user (when he/she initiates a call) or a recipient user (when he/she receives the call).

The call initiation phrase is required to include at least one personality characteristic of the corresponding recipient user in order to find the recipient user in the communication environment, and to forward the call initiation phrase to the recipient user.

According to an embodiment, one or more words of the call initiation phrase can be indicative of a personality characteristic of the recipient user. For example, the call initiation phrase can include one or more words including an official name of the recipient user, a nickname of the recipient user within the voice communication system, and/or an alias word by which the recipient user can be identified as a contact of the caller by the system.

The caller communication device generates a call initiation audio signal which is indicative of the call initiation phrase, and transmits this signal to the system of the present invention via a first communication link that provides coupling of the first communication device to the system within the communication environment.

The system analyses the call initiation audio signal and determines the intention of the caller user to initiate a call session with the corresponding recipient user. During the analysis, the system extracts the personality characteristic of the intended recipient user from the call initiation phrase, and then finds coordinates of the recipient communication device in the communication environment by using this personality characteristic of the recipient user.

As soon as the coordinates of the second communication device are found, the system is then coupled to the second communication device via the second communication link, thereby providing an end-to-end connection from the caller communication device to the recipient communication device. The system then transmits the call initiation audio signal to the recipient site, i.e. to the second communication device. The second communication device, in turn, plays back the call initiation phrase from the call initiation audio signal to the recipient user.

The recipient user, in turn, may react to the call initiation phrase, for example, by uttering a recipient user response phrase, which is intended for playing back on the communication device of the caller user, i.e. on the first communication device. The recipient user response phrase is semantically indicative of a recipient user intention to accept or to reject the proposed call session at the given moment.

According to an embodiment of the present invention, the recipient communication device (i.e. the second communication device) can generate a recipient response audio signal, which is indicative of the recipient user response phrase, and transmits the generated signal to the system via the second communication link.

The system analyses the recipient response audio signal and determines the recipient user intention either to accept or to reject the proposed call session. Depending on the determined recipient user intention, the system can either establish a full-duplex call session between the caller and recipient communication devices, or reject the call session.

In particular, if the recipient user response phrase is indicative of acceptance of the voice communication, the system, after establishing a full-duplex call session, transmits the recipient response audio signal to the caller site, where the recipient user response phrase is played back on the first communication device to the caller user.

As described above, the call initiation phrase can trigger the establishing end-to-end connection from the first communication device to the second communication device. This allows for the other passages uttered by the caller user, which follow the initial call initiation phrase, to be relayed by the system to the recipient user automatically. These passages do not need to be indicative of the recipient user personality, since the recipient user is already suggested by the context of the following voice communication.

On the other hand, if the recipient user response phrase is determined by the system to be indicative of the recipient user intention to reject the call session, the system cancels the procedure of establishment of the full-duplex call session, and returns to the initial state, which was before the call initiation audio signal is received by the system from the first communication device. In this case, the recipient response audio signal may not be transmitted to the caller user.

According to an embodiment of the present invention, any other kinds of recipient user response action patterns by using his communication device, which are indicative of either acceptance or rejection of the call session, can be utilized by the system as a trigger for establishment or rejection of a full-duplex call session between the first and the second communication devices. For example, pressing a control button of the communication device in a predetermined manner (e.g. pressing once, twice, etc. by the recipient user, or physically shaking the device by the recipient user in a predetermined manner) can be utilized by the system as indication of the recipient intention to accept or to reject the initiation of a dialogue between the caller and recipient users.

According to an embodiment of the present invention, termination of the established full-duplex call sessions within the system can be triggered by any kind of system user activities resulting in generation of call termination signals indicative of termination of the call sessions. The call termination signals can be originated either by the recipient user by using the second communication device, or by the caller user by using the first communication device.

Figure 2:
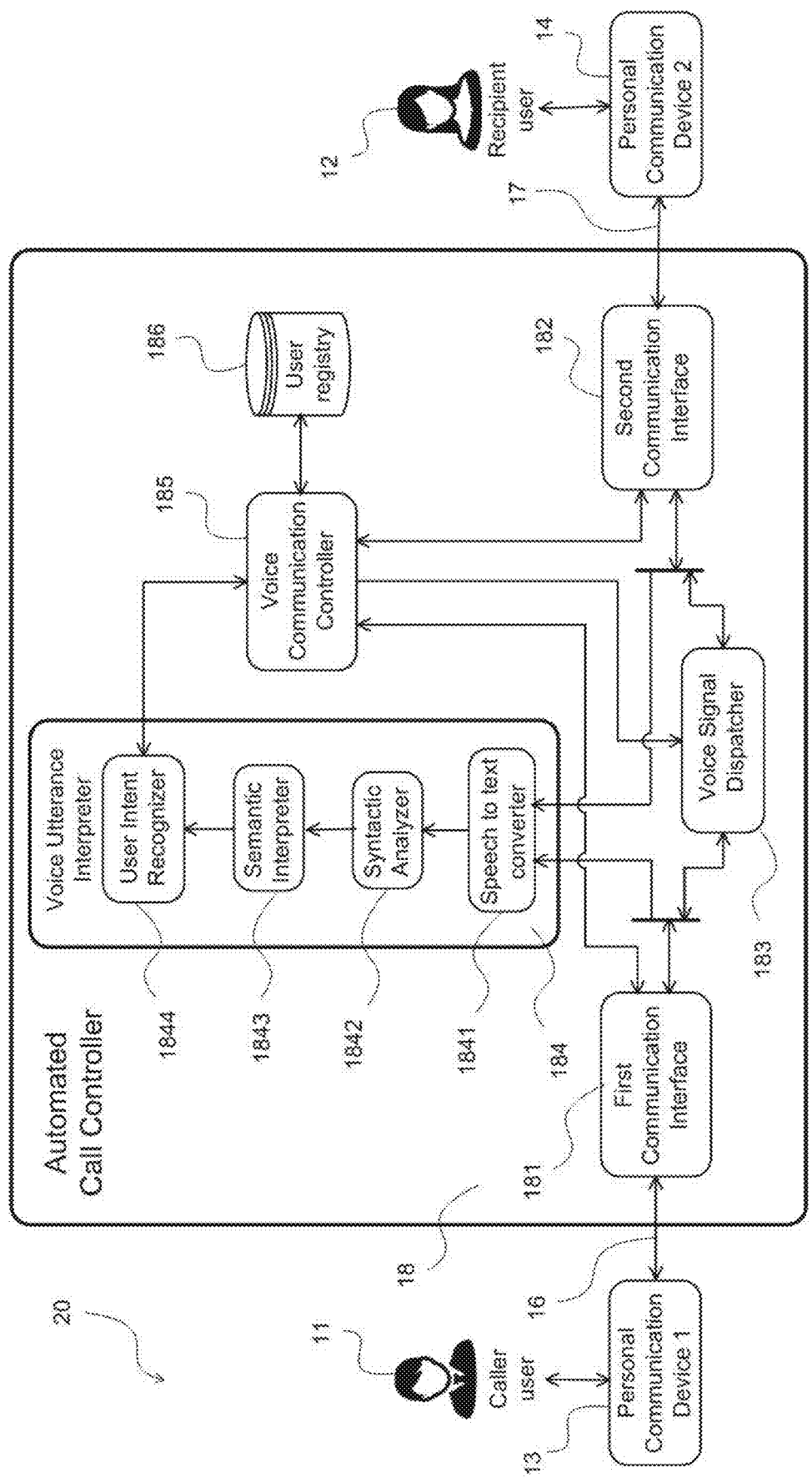
FIG. 2 illustrates a schematic block diagram of a system for providing voice communication sessions between a first communication device associated with a caller user and a second communication device associated with a recipient user in a communication environment, according to an embodiment of the present invention.

Referring to FIG. 2, a system 20 for providing a call session in a communication environment between a first communication device 13 associated with a caller user 11 and a second communication device 14 associated with a recipient user 12 is illustrated, according to an embodiment of the present invention. The first communication device 13 has first device coordinates in the communication environment and the second communication device 14 has second device coordinates in the communication environment.

As described above, the communication environment includes a combination of various communication networks and radio channels in certain radio frequency allocations. Such a combination of the communication networks and radio channels enables coupling of the caller communication devices to the recipient communication devices operating in the communication environment.

Examples of communication networks, that can constitute the communication environment include, but are not limited to, Internet Protocol (IP) based communication networks, both wireless and wired, such as Wi-Fi or Ethernet networks, cellular mobile networks, Wi-MAX networks, etc. Examples of radio channels in radio frequency allocations include, but are not limited to, PMR446 (Private Mobile Radio, 446 MHz) license-free radio channels and American Family Radio Service (FRS) and General Mobile Radio Service (GMRS) radio channels used for walkie-talkie handheld transceivers.

Examples of coordinates of the first communication device 13 and the second communication device 14 within the communication environment include, but are not limited to at least one of: an IP address in a TCP/IP communication network, a number of a radio channel within a predetermined radio frequency allocation, and a unique identifier in a predetermined voice communication system.

According to some embodiments of the present invention, the system 20 includes an automated call controller 18 adapted for being coupled to the first communication device 13 via a first communication link 16 and to the second communication device 14 via a second communication link 17.

Further, it should be appreciated that the first communication device 13 and the second communication device 14 may be embodied in any of a number of forms, such as a smartphone or a computer. In particular, the computer can be a rack-mounted computer, a desktop computer, a laptop computer, or a tablet computer, as non-limiting examples. Additionally, the first communication device 13 and/or the second communication device may be embedded in a device not generally regarded as a smartphone or computer, but with suitable processing capabilities, including a Personal Digital Assistant (PDA), a walkie-talkie handheld transceiver, a personal wearable communication device, a home smart speaker device, an automobile head unit device, or any other suitable portable or fixed electronic device.

An example of a type of the first communication link 16 and an example of a type of the second communication link 17 include, but are not limited to, a Wi-Fi communication link, a mobile cellular communication link, a Walkie-Talkie radio link, a voice messenger communication link of one of existing voice messengers.

According to an embodiment of the present invention, the first and the second communication links are of the same type. Alternatively, the first and the second communication links can be of different types.

It should be understood that the automated call controller 18 includes electronic components and can be implemented as computer systems including corresponding hardware, software, and/or firmware. In particular, the automated call controller 18 can be implemented on the basis of a stand-alone computer system having a combination of dedicated hardware and software. The hardware of the automated call controller 18 can be configured as a corresponding system including such main component as a central processing unit (CPU), a main memory (RAM), a read only memory (ROM), a non-volatile memory (NVM) or persistent storage device, an external memory, etc.

Alternatively, the automated call controller 18 can be implemented as a cloud based service.

It should also be appreciated that various components of the automated call controller 18 described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

The processor of the automated call controller 18 can be preprogrammed by suitable software models capable of analyzing the corresponding input information during signal exchanges between the caller and recipient communication devices 13, 14 and the automated call controller 18. The software components can be stored in the ROM, a rewritable persistent storage device like a hard disk, a solid state memory device like a flash memory, an external memory device or the like, and when required can be loaded into the RAM, and executed by the processor(s). Accordingly, the processor can perform a number of data processing steps, calculations, or estimating functions, some of which will be discussed hereinbelow.

According to some embodiments of the present invention, in the forward direction from the first communication device 13 to the second communication device 14, the automated call controller 18 is configured to couple the first communication device 13 to the automated call controller 18 via the first communication link 16 for receiving a call initiation audio signal from the first communication device 13 via the first communication link 16.

According to an embodiment of the present invention, the call initiation audio signal is indicative of a call initiation phrase uttered by the caller user. The call initiation phrase is indicative of the caller user intention to establish the call session. The call initiation phrase includes one or more personality characteristics of the recipient user. Examples of the personality characteristics include, but are not limited to, a user official name, a user nickname within the voice communication system, a user alias, etc.

As a non-limiting example, if a caller user named Alice wishes to start a voice communication with a recipient user named Bob, the call initiation phrase can be as follows: "Hey Bob, can you talk to me now?" or "Bob, when will you be done today?", and, alternatively, many other informal phrases can be used that include the recipient user personality "Bob".

According to some embodiments, the call initiation audio signal includes a speech signal of the original caller user utterance converted from an acoustic form to a digitized electrical form, and encoded by using one of suitable existing audio codecs. Examples of audio codecs include, but are not limited to, G.711, G.722, G.723.1, G.726, iLBC, Speex, SILK, etc.

According to some embodiments of the present invention, in the forward direction from the first communication device 13 to the second communication device 14, the automated call controller 18 is also configured to analyze the call initiation phrase for determining at least one personality characteristic of the recipient user. The automated call controller 18 is also configured to find the second device coordinates of the second communication device 14 in the communication environment by using the personality characteristic of the recipient user. The automated call controller 18 is also configured to couple the second communication device 14 to the automated call controller 18 via the second communication link 17 by using the second device coordinates. The automated call controller 18 is also configured to transmit the call initiation audio signal to the second communication device 14 via the second communication link 16.

According to some embodiments of the present invention, in a backward direction from the second communication device 14 to first communication device 13, the automated call controller 18 is configured to receive a recipient user reaction signal from the second communication device 14 provided by the recipient user in response to the call initiation audio signal via the second communication link 16. The recipient user reaction signal is indicative of a recipient user intention that can be either a recipient acceptance intention, when the recipient user intends to accept the call and start a voice communication with the caller user, or a recipient rejection intention of the call session, when the recipient user intends to decline the invitation of the caller user.

The automated call controller 18 is also configured to analyze the recipient user reaction signal in order to determine indication of the recipient user intention, and, if the recipient user intention is the recipient acceptance intention of the call session, to establish a full-duplex call session between the first and the second communication devices, and to exchange audio signals between the first and second communication devices during the established call session. The audio signals are generated during a voice communication of the caller user and the recipient user. As will be described hereinbelow in detail, the recipient user reaction signal is selected from a recipient response audio signal and a recipient response action signal.

According to an embodiment of the present invention, the recipient response audio signal is indicative of recipient user response phrase. The recipient user response phrase is indicative of the recipient user intention either to accept the call session or to reject the call session.

Thus, in response to Alice's call initiation phrase of the examples above, Bob can for example, say: "Sure, let's talk" or "In two hours, I guess" respectively, when the recipient user intends to accept the call invitations. Alternatively, if the recipient user intends to reject the proposed voice communication, he can reply, for example, but not limited by this example: "Reject", "Cancel", etc.

According to some embodiments, the recipient response audio signal includes a speech signal of the original recipient user utterance converted from an acoustic form to a digitized electrical form, and encoded by using one of suitable existing audio codecs. Examples of audio codecs include, but are not limited to, G.711, G.722, G.723.1, G.726, iLBC, Speex, SILK, etc.

According to an embodiment of the present invention, the automated call controller 18 includes a first communication interface 181 adapted for being coupled to the first communication device 13 via the first communication link 16, a second communication interface 182 adapted for being coupled to the second communication device 14 via the second communication link 17, and a voice signal dispatcher 183 coupled to the first communication interface 181 and to the second communication interface 182.

The automated call controller 18 also includes a voice utterance interpreter 184 coupled to the first communication interface 181, and to the second communication interface 182.

The automated call controller 18 also includes a voice communication controller 185 coupled to the voice utterance interpreter 184, to the voice signal dispatcher 183, to the first communication interface 181, and to the second communication interface 182.

The automated call controller 18 also includes a user registry 186 coupled to the voice communication controller 185.

According to an embodiment of the present invention, for establishing voice communication between the first and second communication devices 13 and 14, the first communication interface 181 is configured, in the forward direction, to couple the first communication device 13 to the automated call controller 18 via the first communication link 16, and to receive the call initiation audio signal provided by the caller user via the first communication link 16. The first communication interface 181 is also configured to forward the call initiation audio signal to the voice signal dispatcher 183 and to the voice utterance interpreter 184. The first communication interface 181 is also configured to exchange audio signals between the voice signal dispatcher 183 and the first communication device 13 during the call session. The audio signals are generated during a voice communication of the caller user and the recipient user.

According to an embodiment of the present invention, the second communication interface 182 is configured, in the forward direction, to receive the call initiation audio signal from the voice signal dispatcher 183, and to forward the call initiation audio signal to the second communication device 14 via the second communication link 16. The second communication interface 182 is also configured to exchange audio signals between the voice signal dispatcher 183 and the second communication device 14 during the call session. Such audio signals are generated during a voice communication of the caller user and the recipient user.

In operation, the forwarding of the call initiation audio signal by the second communication interface 182 to the second communication device 14 includes receiving the call initiation audio signal from the voice signal dispatcher 183, and receiving a transmission command signal from the voice communication controller 185. It should be noted that the transmission command signal is indicative of the second device coordinates of the second communication device 14. Then, the second communication device 14 is coupled to the second communication interface 182 via the second communication link 17 by using the second device coordinates. After the coupling, the call initiation audio signal is transmitted to the second communication device 14 via the second communication link 17.

According to an embodiment of the present invention, the voice signal dispatcher 183 is configured for exchanging the audio signals between the first communication interface 181 and the second communication interface 182.

According to an embodiment of the present invention, the exchanging of the audio signals provided by the voice signal dispatcher 183 between the first communication interface 181 and the second communication interface 182, in the forward direction from the first communication interface 181 to the second communication interface 182, includes receiving the audio signal from the first communication interface 181, buffering the received audio signal, and forwarding the buffered audio signal to the second communication interface 182.

According to an embodiment of the present invention, the exchanging of the audio signals provided by the voice signal dispatcher 183 between the first communication interface 181 and the second communication interface 182, in the backward direction from the second communication interface 182 to the first communication interface 181, includes receiving the audio signal from the second communication interface 182, buffering the received audio signal, and forwarding the buffered audio signal to the first communication interface 181.

According to an embodiment of the present invention, the voice utterance interpreter 184 is configured to analyze the call initiation audio signal in order to determine the call initiation phrase, so as to determine the caller user intention to establish the call session. The voice utterance interpreter 184 is also configured to determine the at least one personality characteristic of the recipient user from the call initiation phrase.

The voice utterance interpreter 184 is also configured to generate caller user intention data that includes the personality characteristic of the recipient user, and to relay the caller user intention data to the voice communication controller 185.

According to an embodiment of the present invention, the voice utterance interpreter 184 is further configured to analyze the recipient response audio signal in order to recognize the recipient user intention, which can be either a recipient acceptance intention or the recipient rejection intention of the call session.

The voice utterance interpreter 184 is also configured to generate recipient user intention data indicative of the recipient user intention, and to provide the recipient user intention data to the voice communication controller 185.

According to an embodiment of the present invention, the voice utterance interpreter 184 includes a speech to text converter 1841 coupled to the first communication interface 181, and to the second communication interface 182. The speech to text converter 1841 is configured for receiving the call initiation audio signal from the first communication interface 181, and for receiving the recipient response audio signal from the second communication interface 182. The speech to text converter 1841 is also configured for extracting the call initiation phrase uttered by the caller user from the call initiation audio signal and for extracting the recipient user response phrase uttered by the recipient user from the recipient response audio signal. The speech to text converter 1841 is also configured for converting the call initiation phrase and the recipient user response phrase to a text form.

According to an embodiment of the present invention, the voice utterance interpreter 184 also includes a syntactic analyzer 1842 coupled to the speech to text converter 1841. The syntactic analyzer 1842 is configured for performing syntactic analysis of the call initiation phrase and the recipient user response phrase, in order to decompose the phrases into phrase elements. For example, the call initiation phrase "Hey, Bob, can you talk to me?" includes the following phrase elements: "hey", "Bob," "can you talk", "to" and "me". In turn, the recipient user response phrase "Sure, let's talk" includes the following phrase elements: "Sure," and "let's talk".

According to an embodiment of the present invention, the voice utterance interpreter 184 also includes a semantic interpreter 1843 coupled to the syntactic analyzer 1842. The semantic interpreter 1843 is configured for performing semantic interpretation of the phrase elements. The semantic interpretation of the phrase elements includes augmenting the phrase elements by a markup data, which indicate an expected meaning of the corresponding phrase elements in the context of the particular application of the system.

For example, when the voice utterance interpreter 184 analyses the following call initiation phrase: "Hey, Bob, can you talk to me?", the semantic interpreter 1843 provides augmentation by marking up the phrase element "Hey" as a greeting, and the phrase element "Bob" as a personal characteristic (i.e., the name) of the recipient user. Likewise, the phrase element "can you talk" can be interpreted and marked up as an indication of the caller user intention to start communication. It should be noted that in this example, the phrase elements "to" and "me" can be disregarded by the semantic interpreter 1843.

Likewise, when the voice utterance interpreter 184 analyses the following call recipient user response phrase: "Sure, let's talk", the semantic interpreter 1843 makes augmentation of this phrase by marking up the phrase element "Sure" as an agreement, while the phrase element "let's talk" is marked up as an intention to accept the invitation of the caller user.

According to an embodiment of the present invention, the voice utterance interpreter 184 also includes a user intent recognizer 1844 coupled to the semantic interpreter 1843, and to the voice communication controller 185. The user intent recognizer 1844 is configured to receive semantically interpreted phrase elements from the semantic interpreter 1843, and to recognize the caller user and the recipient user intentions from the semantically interpreted phrase elements. It should be noted that the caller user intention is the intention to initiate a call, while the recipient user intention can be the intention either to accept or reject the call.

The user intent recognizer 1844 is further configured to extract one or more personality characteristics of the recipient user from the semantically interpreted phrase elements of the call initiation phrase. The user intent recognizer 1844 is also configured for generating user intention data that includes the personality characteristic(s) of the recipient user corresponding to the call initiation phrase and the user intention data indicative of the recipient user intentions corresponding to the recipient user response phrase.

For example, when the user intent recognizer 1844 receives, from the semantic interpreter 1843, the phrase element "can you talk" that has the corresponding expected meaning that indicates the caller user intention to talk, the user intent recognizer 1844 determines the particular kind of intention implied in the particular phrase element. Specifically, the phrase element "can you talk" is recognized as the intention to establish a voice communication.

In turn, when the user intent recognizer 1844 receives from the semantic interpreter 1843, the phrase element "let's talk" originated from Bob, the user intent recognizer 1844 determines that the phrase element "let's talk" indicates a recipient user intention to accept the voice communication proposed by the caller user Alice.

The user intent recognizer 1844 is also configured for providing the generated user intention data to the voice communication controller 185. The user intention data can, for example, be represented in any one of known existing formats for data representation, such as JSON (JavaScript Object Notation), XML (Extensible Markup Language), CSV (Comma-Separated Values), etc.

According to an embodiment of the present invention, the voice communication controller 185 is configured for establishing full-duplex call sessions between the first communication device 13 and the second communication device 14.

According to an embodiment of the present invention, the user registry 186 is configured for storing a contact list of the caller user. The contact list includes a set of recipient user records. Each recipient user record includes recipient user data including recipient user personality characteristics, and coordinates of a corresponding communication device of the recipient user within the communication environment. The set of recipient user records includes all potential recipient users of the system associated with the caller user. The user registry 186 is also configured for transmitting the data of the recipient user record from the contact list to the voice communication controller 185 upon receipt of a corresponding request from the voice communication controller 185.

As described above, the recipient user reaction signal provided by the recipient user by using the second communication device 14 in response to the call initiation audio signal originated from the caller user can be either the recipient response audio signal or the recipient response action signal.

According to an embodiment of the present invention, the second communication interface 182 is further configured, in the backward direction from the second communication device 14 to the first communication device 13, to receive the recipient response audio signal from the second communication link 17, and then to forward the recipient response audio signal to the voice signal dispatcher 183 and to the voice utterance interpreter 184. It should be noted that the recipient response audio signal is provided by the second communication device and originated from the recipient user.

In turn, in the backward direction (i.e. from the second communication device to the first communication device), the first communication interface 181 is also configured to receive the recipient response audio signal from the voice signal dispatcher 183. The first communication interface 181 is also configured to forward the recipient response audio signal to the first communication device 13 via the first communication link 16.

In operation, in the backward direction, the forwarding of the recipient response audio signal by the first communication interface 181 to the first communication device 13, includes receiving the recipient response audio signal from the voice signal dispatcher 183, and receiving a transmission command signal from the voice communication controller 185. It should be noted that the transmission command signal is associated with the established call session between the first communication device 13 and the second communication device 14. The forwarding of the recipient response audio signal by the first communication interface 181 to the first communication device 13 also includes transmitting the recipient response audio signal to the first communication device 13 via the first communication link 16.

According to an embodiment of the present invention, the recipient response action signal is indicative of a recipient user action pattern. The recipient user action pattern is indicative of a recipient user intention. The recipient user intention is selected from a recipient acceptance intention and a recipient rejection intention of the call session.

According to an embodiment of the present invention, in the backward direction from the second communication device 14 to the first communication device 13, the second communication interface 182 is further configured for receiving the recipient response action signal from the second communication device 14 via the second communication link 17, and forwarding the received recipient response action signal to the voice communication controller 185.

According to an embodiment of the present invention, in order to terminate the full-duplex call session established between the first and second communication devices 13 and 14, the first communication interface 181 is configured for receiving a call termination signal from the first communication device 13 via the first communication link 16, and forwarding the received call termination signal to the voice communication controller 185. It should be noted that the call termination signal is indicative of an intention of the caller user to terminate an established full-duplex call session between the first and the second communication devices.

According to an embodiment of the present invention, the voice communication controller 185 is also configured for generating a decoupling signal and for providing the decoupling signal to the second communication interface 182.

According to an embodiment of the present invention, the second communication interface 182 is further configured for disconnecting the second communication link, thereby decoupling the second communication device 14 from the automated call controller 18, in response to the decoupling signal.

According to an embodiment of the present invention, the voice communication controller 185 is further configured for generating a resetting signal and for providing the resetting signal to the voice signal dispatcher 183. In turn, the voice signal dispatcher 183 is responsive to the resetting signal, and is configured to delete all buffered audio signals.

According to an embodiment of the present invention, in order to terminate the full-duplex call session established between the first and second communication devices 13 and 14, the second communication interface 182 is further configured for receiving a call termination signal from the second communication device 14 via the second communication link 17, and forwarding the received call termination signal to the voice communication controller 185. It should be noted that the call termination signal is indicative of an intention of the recipient user to terminate an established full-duplex call session between the first and the second communication devices.

According to an embodiment of the present invention, the voice communication controller 185 is further configured for generating a decoupling signal and for providing the decoupling signal to the second communication interface 182.

According to an embodiment of the present invention, the second communication interface 182 is also configured for disconnecting the second communication link, thereby decoupling the second communication device 14 from the automated call controller 18 in response to the decoupling signal.

According to an embodiment of the present invention, the voice communication controller 185 is further configured for generating a resetting signal and for providing the resetting signal to the voice signal dispatcher 183. The voice signal dispatcher is responsive to the resetting signal to delete all buffered audio signals.

According to another embodiment of the present invention, in order to enhance reliability of initiation of voice communication sessions and to minimize a probability of erroneous system reactions, the caller user may perform certain actions in order to provide a system activation signal, which explicitly indicates to the automated call controller 18 that the caller user wishes to initiate a call session. In this case, the first communication interface 181 is further configured for receiving the system activation signal that is followed by the call initiation audio signal. The system activation signal and the call initiation audio signal are provided by the first communication device 13 via the first communication link 16. The system activation signal is generated by the communication device 13 of the caller user 11 in response to actions of the caller user, which are performed on his communication device 13. The system activation signal is used for activating the automated call controller 18 in order to begin the analyzing of the call initiation audio signal that followed the system activation signal, thereby initiating a process of call session establishment.

According to this embodiment, the first communication interface 181 is further configured to forward the received system activation signal to the voice communication controller 185, and for forwarding the received call initiation audio signal to the voice utterance interpreter 184 and to the voice signal dispatcher 183.

According to this embodiment, the first voice communication controller 185 is responsive to the system activation signal in order to generate an utterance analyzing instruction signal and to provide the generated utterance analyzing instruction signal to the voice utterance interpreter 184, thereby instructing the voice utterance interpreter 184 to begin analyzing of the call initiation audio signal.

In turn, voice utterance interpreter 184 is responsive to the utterance analyzing instruction signal to begin analyzing the call initiation audio signal that is followed by the system activation signal.

According to an embodiment of the present invention, any types of caller user actions by using the communication device 13, can result in generation of the system activation signal by the communication device of the caller user. Examples of caller user actions that can result in generation of the system activation signal, include, but are not limited to, pressing a control button of the communication device in a predetermined pattern (e.g., pressing the control button once, twice, etc.), and/or physically shaking the device by the caller user in a predetermined manner.

In practice, the caller user 11 clicks the control button (not shown) on his communication device 13, and then the caller user 11 can utter the call initiation phrase. The clicking of the control button, in this example, can result in generation of the system activation signal and in transmission of this signal to the first communication interface 181 of the automated call controller 18. Then, the call initiation audio signal, which is indicative of the uttered call initiation phrase, is generated by the caller communication device 13 and transmitted to the first communication interface 181. The call initiation audio signal is followed by the system activation signal.

Figure 3:
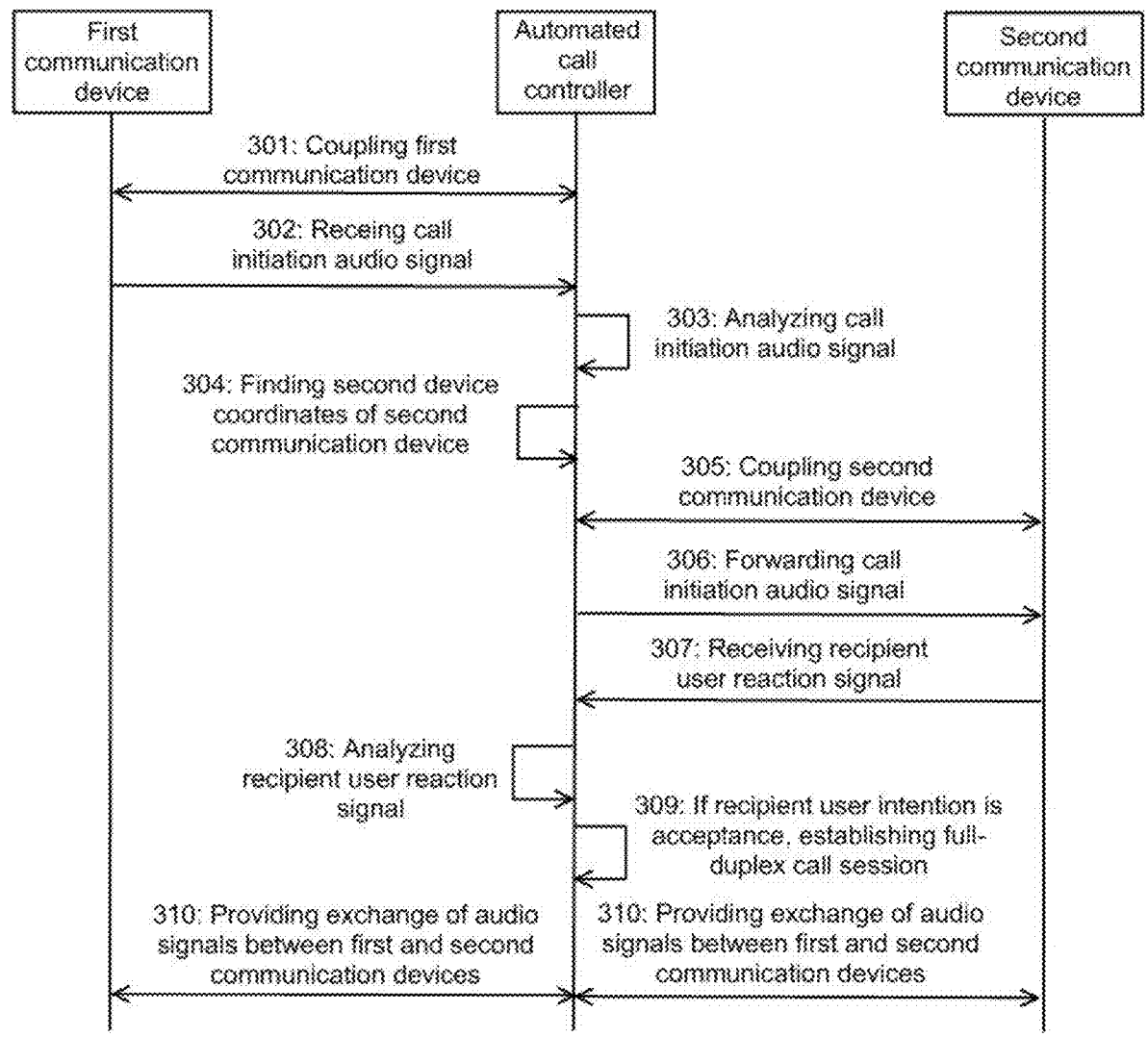
FIG. 3 illustrates a schematic sequence diagram of a method for providing a call session in a communication environment between a first communication device associated with a caller user and a second communication device associated with a recipient user, according to an embodiment of the present invention.

Referring to FIG. 3, a schematic sequence diagram for a method for providing a call session between a first communication device associated with a caller user and a second communication device associated with a recipient user in a communication environment is illustrated, according to an embodiment of the present invention. The method is based on the system (20 in FIG. 2) for establishing a call session in a communication environment described above.

Referring to FIGS. 2 and 3 together, according to an embodiment of the present invention, the method, in a forward direction from the first communication device 13 to the second communication device 14, the method starts from the step 301 of coupling the first communication device 13 to the automated call controller 18 via the first communication link 16.

The method for establishing of a full-duplex call session further includes the step 302 of receiving a call initiation audio signal from the first communication device 13 by the automated call controller 18. As described above, the call initiation audio signal is indicative of at least one call initiation phrase uttered by the caller user. The call initiation phrase is indicative of a caller user intention to establish the call session. The call initiation phrase includes at least one personality characteristic of the recipient user.

According to an embodiment, the receiving (Step 302) of the call initiation audio signal from the first communication device 13 by the automated call controller 18 includes buffering a copy of the call initiation audio signal.

The method for establishing of a full-duplex call session further includes the step 303 of analyzing the call initiation audio signal in order to determine one or more personality characteristics of the recipient user.

Figure 4:
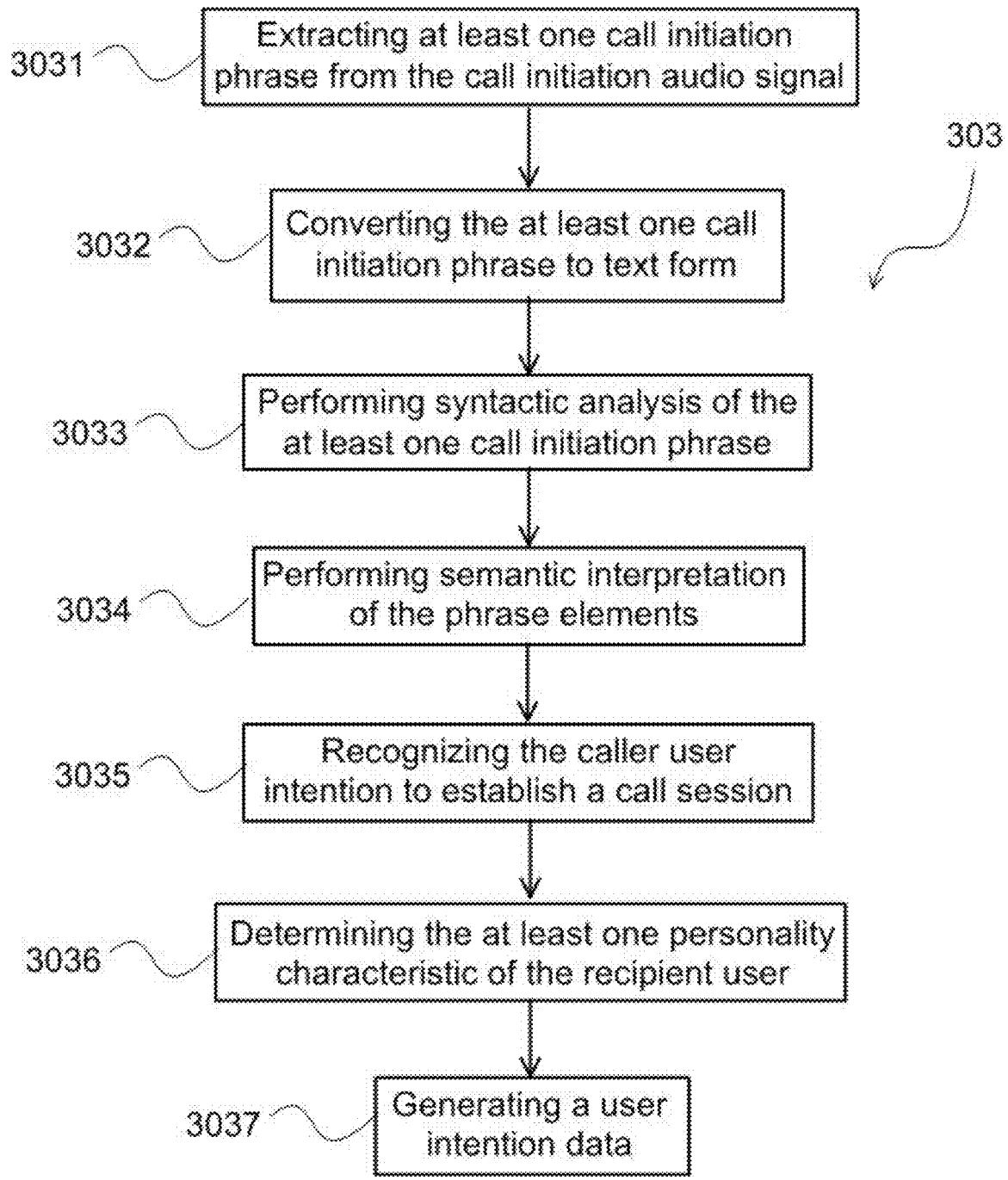
FIG. 4 illustrates a schematic flowchart diagram for the step of analyzing a call initiation audio signal of the method of FIG. 3, according to an embodiment of the present invention.

Referring to FIG. 4, a schematic flowchart diagram for the step 303 of analyzing a call initiation audio signal is illustrated, according to an embodiment of the present invention. The analyzing (Step 303) of the call initiation audio signal includes extracting (Substep 3031) at least one call initiation phrase uttered by the caller user from the call initiation audio signal, and converting (Substep 3032) the call initiation phrase to a text form. The analyzing (Step 303) of the call initiation audio signal further includes performing (Step 3033) syntactic analysis of the call initiation phrase, in order to decompose the call initiation phrase into corresponding phrase elements. Then, semantic interpretation of the phrase elements is performed (Substep 3034). Further, the caller user intention to establish a call session is recognized (Substep 3035) and one or more personality characteristics of the recipient user are determined (Substep 3036) from the semantically interpreted phrase elements. Then, a user intention data is generated (Substep 3037) that includes the personality characteristic(s) of the recipient user with whom the caller user intends to establish the call session.

Turning back to FIG. 3, the method for providing of a call session further includes the step 304 of finding the second device coordinates of the second communication device in the communication environment by using the personality characteristic(s) of the recipient user.

According to an embodiment, the finding (Step 304) of the second device coordinates of the second communication device includes: finding a corresponding recipient user record within the contact list by using the personality characteristic(s) of the recipient user as a search parameter, and extracting the second device coordinates of the corresponding second communication device of the recipient user within the communication environment from the recipient user record.

As shown in FIG. 3, the method for providing a call session further includes the step 305 of coupling the automated call controller 18 to the second communication device via the second communication link 17 in the communication environment by using the second device coordinates of the second communication device, and the step 306 of forwarding the call initiation audio signal to the second communication device.

According to an embodiment of the present invention, the method for providing of a call session, in a backward direction from the second communication device 14 to the first communication device 13, includes the step 307 of receiving a recipient user reaction signal from the second communication device by the automated call controller 18 in response to the call initiation audio signal. The recipient user reaction signal is indicative of a recipient user intention that is selected from recipient acceptance intention and recipient rejection intention of the call session.

According to some embodiments, the recipient user reaction signal is selected from a recipient response audio signal and a recipient response action signal.

Thus, according to one embodiment, the recipient user reaction signal is the recipient response audio signal that is indicative of at least one recipient user response phrase that is indicative of the recipient user intention to accept the call session, or to reject the call session.

According to an embodiment, in the backward direction from the second communication device 14 to the first communication device 13, the receiving of the recipient response audio signal from the second communication device includes buffering a copy of the recipient response audio signal in the voice signal dispatcher 183.

As shown in FIG. 3, the method for providing a call session, in a backward direction from the second communication device 14 to the first communication device 13, also includes the step 308 of analyzing the recipient user reaction signal to determine indication of the recipient user intention.

Figure 5:
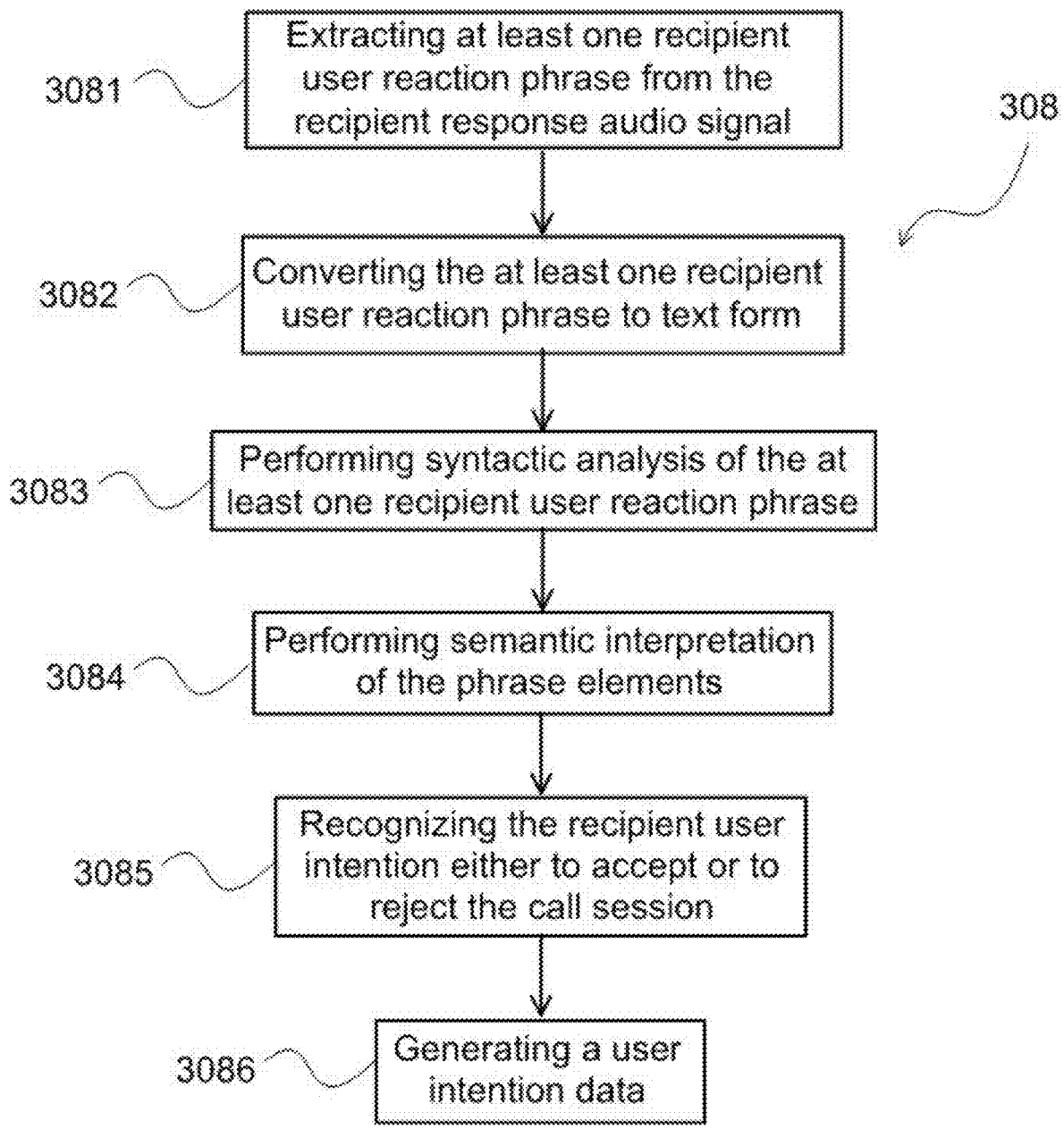
FIG. 5 illustrates a schematic flowchart diagram for the step of analyzing a recipient response audio signal of the method of FIG. 3, according to an embodiment of the present invention.

Referring to FIG. 5, a schematic flowchart diagram for the step 308 of analyzing a recipient response audio signal is illustrated, according to an embodiment of the present invention. The analyzing of the recipient response audio signal includes extracting (Substep 3081) one or more recipient user response phrases uttered by the recipient user from the recipient response audio signal, and converting (Substep 3082) the recipient user response phrases to a text form. The analyzing of the recipient response audio signal also includes performing (Substep 3083) syntactic analysis of the recipient user response phrase(s), in order to decompose the recipient user response phrase(s) into corresponding phrase elements. Then, a performing (Substep 3084) semantic interpretation of the phrase elements is performed (Substep 3084). As a result, the recipient user intention either to accept or to reject the call session is recognized (Substep 3085) from the semantically interpreted phrase elements, and a user intention data indicative of the recipient user intention is generated (Substep 3086).

Turning back to FIG. 3, if the recipient user intention is determined as an acceptance of the call session, then a full-duplex call session between the first and the second communication devices is established (Step 309) and exchange of audio signals between the first and the second communication devices is provided (Step 310) during the established call session. The audio signals are generated during the voice communication of the caller user and the recipient user.

Alternatively, if the recipient user intention is determined as a rejection of the call session, the method, according to some embodiments, includes canceling a procedure of the establishment of the full-duplex call session between the first and the second communication devices 13 and 14.

According to an embodiment of the present invention, the canceling of the full-duplex call session includes decoupling the second communication device from the automated call controller by disconnecting the second communication link. After the disconnecting of the second communication link, the recipient user reaction signal can be deleted.

According to another embodiment, the recipient user reaction signal is a recipient response action signal that is indicative of a recipient user action pattern. The recipient user action pattern is indicative of a recipient user intention either to accept the call session, or to reject the call session.

According to an embodiment of the present invention, any types of recipient user actions by using his personal communication device, which are indicative of acceptance or rejection of the voice communication, can be utilized by the system as a trigger for establishment or rejection of a full-duplex voice communication session between the caller and the recipient users. For example, such a pattern of the recipient user actions as pressing a control button of the communication device in a predetermined action pattern (e.g., pressing the control button once, twice, etc., and/or physically shaking the device by the recipient user in a predetermined manner) can be utilized by the system as indication of the recipient intention to accept or to reject the initiation of a voice communication between the caller and recipient users.

It should be understood that either the caller user or a recipient user may terminate the full-duplex call session that was established between the first and the second communication devices 13 and 14.

Accordingly, terminating the full-duplex call session by the caller user includes receiving a call termination signal from the first communication device 13 via the first communication link 16. The call termination signal is indicative of the intention of the caller user to terminate the full-duplex call session established between the first and second communication devices 13 and 14.

Accordingly, in response to the call termination signal, the method includes terminating the established full-duplex call session. According to an embodiment, the terminating includes interrupting exchange of the audio signals between the first communication device 13 and the second communication device 14, and decoupling the second communication device 14 from the automated call controller 18 by disconnecting the second communication link 17.

Likewise, terminating the full-duplex call session by the recipient user includes receiving a call termination signal from the second communication device 14 via the second communication link 17. The call termination signal is indicative of the intention of the recipient user to terminate the full-duplex call session established between the first and second communication devices 13 and 14.

In response to the call termination signal, terminating the established full-duplex call session includes interrupting exchange of the audio signals between the first communication device 13 and the second communication device 14, and decoupling the second communication device from the automated call controller 18 by disconnecting the second communication link 17.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Also, it is to be understood that the phraseology and terminology employed herein are for the purpose of description and should not be regarded as limiting.

Finally, it should be noted that the words "comprising", "including" and "having" as used throughout the appended claims are to be interpreted to mean "including but not limited to".

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for providing a call session in a communication environment between a first communication device associated with a caller user and having first device coordinates in the communication environment and a second communication device associated with a recipient user and having second device coordinates in the communication environment, the system comprising an automated call controller, the automated call controller adapted for being coupled to the first communication device via a first communication link and to the second communication device via a second communication link; wherein in a forward direction from the first communication device to the second communication device, the automated call controller is configured for:

coupling said first communication device to the automated call controller via the first communication link;

receiving a call initiation audio signal from the first communication device via the first communication link, said call initiation audio signal being indicative of at least one call initiation phrase uttered by the caller user, said call initiation phrase being indicative of the caller user intention to establish said call session, said call initiation phrase including at least one personality characteristic of the recipient user;

analyzing said call initiation audio signal in order to determine said at least one call initiation phrase, so as to determine the caller user intention to establish the call session; and to determine said at least one personality characteristic of the recipient user;

finding said second device coordinates of the second communication device in the communication environment by using said at least one personality characteristic of the recipient user;

coupling said second communication device to the automated call controller via the second communication link by using said second device coordinates;

transmitting said call initiation audio signal to said second communication device via said second communication link;

in a backward direction from the second communication device to the first communication device, the automated call controller is configured for:

receiving a recipient user reaction signal from the second communication device via the second communication link provided by the recipient user in response to said call initiation audio signal, said recipient user reaction signal being indicative of a recipient user intention, said recipient user intention being selected from a recipient acceptance intention and a recipient rejection intention of the call session;

analyzing the recipient user reaction signal to determine indication of the recipient user intention; and if the recipient user intention is the recipient acceptance intention of the call session, establishing a full-duplex call session between the first and the second communication devices; and exchanging audio signals between the first and second communication devices during said established call session, said audio signals being generated during a voice communication of the caller user and the recipient user;

wherein said automated call controller comprises:

a first communication interface adapted for being coupled to the first communication device via said first communication link;

a second communication interface adapted for being coupled to the second communication device via said second communication link;

a voice signal dispatcher coupled to said first communication interface and to said second communication interface;

a voice utterance interpreter coupled to said first communication interface, and to said second communication interface;

a voice communication controller coupled to the voice utterance interpreter, to the voice signal dispatcher, to the first communication interface, and to the second communication interface; and a user registry coupled to the voice communication controller;

the first communication interface being configured for:

in the forward direction, coupling said first communication device to the automated call controller via the first communication link; receiving said call initiation audio signal provided by the first communication device from said first communication link, and forwarding said call initiation audio signal to the voice signal dispatcher and to the voice utterance interpreter; and the exchanging of the audio signals between the voice signal dispatcher and the first communication device during the call session, said audio signals being generated during a voice communication of the caller user by using the first communication device and the recipient user by using the second communication device;

the second communication interface being configured for:
  in the forward direction, receiving said call initiation audio signal from the voice signal dispatcher, and forwarding said call initiation audio signal to the second communication device via the second communication link; and
  the exchanging of the audio signals between the voice signal dispatcher and the second communication device during the call session;

the voice signal dispatcher being configured for:
  exchanging said audio signals between the first communication interface and the second communication interface;

the voice utterance interpreter being configured for:
  analyzing of said call initiation audio signal in order to determine said at least one call initiation phrase, so as to determine the caller user intention to establish the call session; and to determine said at least one personality characteristic of the recipient user;
  generating caller user intention data including said at least one personality characteristic of the recipient user; and
  providing the caller user intention data to the voice communication controller;

the voice communication controller being configured for establishing of full-duplex call sessions between the first communication device and the second communication device; and the user registry being configured for:
  storing a contact list of the caller user, said contact list includes a set of recipient user records, each recipient user record includes recipient user data including recipient user personality characteristics, and coordinates of a corresponding communication device of the recipient user within the communication environment, the set of recipient user records being associated with all potential recipient users of the system associated with said caller user; and
  transmitting the data of the recipient user record from said contact list to the voice communication controller in response to a corresponding request from the voice communication controller.

2. The system of claim 1, wherein said forwarding of the call initiation audio signal by the second communication interface to the second communication device, in the forward direction from the first communication device to the second communication device, comprises:
  receiving said call initiation audio signal from said voice signal dispatcher;
  receiving a transmission command signal from the voice communication controller, said transmission command signal being indicative of the second device coordinates of said second communication device;
  coupling the second communication device to the second communication interface via the second communication link by using said second device coordinates; and
  transmitting said call initiation audio signal to the second communication device (14) via the second communication link.

3. The system of claim 1, wherein said recipient user reaction signal is selected from a recipient response audio signal and a recipient response action signal.

4. The system of claim 3, wherein said recipient response audio signal is indicative of a recipient user response phrase, said recipient user response phrase being indicative of the recipient user intention to accept the call session, or to reject the call session.

5. The system of claim 4, wherein:
  said second communication interface is further configured, in the backward direction from the second communication device to the first communication device, for:
    receiving said recipient response audio signal from said second communication link, said recipient response audio signal being provided by the second communication device; and
    forwarding said recipient response audio signal to the voice signal dispatcher and to the voice utterance interpreter;
  the first communication interface is further configured, in the backward direction, for:
    receiving said recipient response audio signal from the voice signal dispatcher said recipient response audio signal being provided by the second communication device; and
    forwarding said recipient response audio signal to the first communication device via said first communication link; and
  said voice utterance interpreter being further configured for:
    analyzing said recipient response audio signal to recognize the recipient user intention selected from the recipient acceptance intention and the recipient rejection intention of the call session;
    generating recipient user intention data indicative of the recipient user intention; and
    providing the recipient user intention data to the voice communication controller.

6. The system of claim 5, wherein, in the backward direction from the second communication device to the first communication device, said forwarding of the recipient response audio signal by the first communication interface to the first communication device via said first communication link, comprises:
  receiving said recipient response audio signal from said voice signal dispatcher;
  receiving a transmission command signal from the voice communication controller, said transmission command signal being associated with the established call session between the first communication device and the second communication device; and
  transmitting said recipient response audio signal to the first communication device via the first communication link.

7. The system of claim 1, wherein said exchanging audio signals between the first communication interface and the second communication interface provided by the voice signal dispatcher, comprises:
  in the forward direction from the first communication interface to the second communication interface,
    receiving said audio signal from said first communication interface,
    buffering said received audio signal; and
    forwarding said buffered audio signal to the second communication interface; and
  in the backward direction:
    receiving said audio signal from the second communication interface;
    buffering said received audio signal; and
    forwarding said buffered audio signal to the first communication interface.

8. The system of claim 4, wherein said voice utterance interpreter comprises:
  a speech to text converter coupled to the first communication interface, and to the second communication interface, the speech to text converter configured for:
    receiving the call initiation audio signal from the first communication interface, and the recipient response audio signal from the second communication interface,
    extracting said at least one call initiation phrase uttered by the caller user from said call initiation audio signal and said at least one recipient user response phrase uttered by the recipient user from said recipient response audio signal; and
    converting said at least one call initiation phrase and said at least one recipient user response phrase to a text form;
  a syntactic analyzer coupled to the speech to text converter, and configured for performing syntactic analysis of said at least one call initiation phrase and said at least one recipient user response phrase, in order to decompose the phrases into corresponding phrase elements;
  a semantic interpreter coupled to the syntactic analyzer, and configured for performing semantic interpretation of said phrase elements;
  a user intent recognizer coupled to the semantic interpreter, and to the voice communication controller, said user intent recognizer configured for:
    recognizing the caller user and the recipient user intentions from semantically interpreted phrase elements of said at least one call initiation phrase and said at least one recipient user response phrase;
    extracting said at least one personality characteristic of the recipient user from said call initiation phrase elements;
    generating user intention data including said at least one personality characteristic of the recipient user corresponding to the at least one call initiation phrase and user intention data indicative of the recipient user intentions corresponding to said at least one recipient user response phrase, and
    providing said generated user intention data to the voice communication controller.

9. The system of claim 1, wherein a type of said first communication link and a type of said second communication link are selected from: a Wi-Fi communication link, a mobile cellular communication link, a Walkie-Talkie radio link, and a voice messenger communication link of one of existing voice messengers.

10. The system of claim 9, wherein the first and the second communication links are of the same type.

11. The system of claim 9, wherein the first and the second communication links are of different types.

12. The system of claim 1, wherein said at least one personality characteristic of a recipient user includes at least one of: a user official name, a user nickname within the voice communication system, and a user alias.

13. The system of claim 1, wherein the coordinates of the first communication device and the second communication device within the communication environment include at least one of: an IP address in a TCP/IP communication network, a number of radio channel within a predetermined radio frequency allocation, and a unique identifier in a predetermined voice communication system.

14. The system of claim 3, wherein said recipient response action signal is indicative of a recipient user action pattern, said recipient user action pattern being indicative of a recipient user intention selected from a recipient acceptance intention and a recipient rejection intention of the call session.

15. The system of claim 14, wherein the second communication interface is further configured for,
  in the backward direction, from the second communication device to the first communication device,
    receiving said recipient response action signal from the second communication device via the second communication link; and
    forwarding said received recipient response action signal to the voice communication controller.

16. The system of claim 1, wherein:
said first communication interface is further configured for:
  receiving a call termination signal from the first communication device via the first communication link, said call termination signal being indicative of an intention of the caller user to terminate an established full-duplex call session between the first and the second communication devices; and
  forwarding said received call termination signal to the voice communication controller, said voice communication controller being further configured for generating a decoupling signal and for providing the decoupling signal to the second communication interface, the second communication interface being further configured for disconnecting the second communication link, thereby decoupling the second communication device from the automated call controller in response to said decoupling signal, said voice communication controller being further configured for generating a resetting signal and for providing the resetting signal to the voice signal dispatcher; the voice signal dispatcher being responsive to the resetting signal to delete all buffered audio signals.

17. The system of claim 1, wherein
said second communication interface is further configured for:
  receiving a call termination signal from the second communication device via the second communication link, said call termination signal being indicative of an intention of the recipient user to terminate an established full-duplex call session between the first and the second communication devices; and
  forwarding said received call termination signal to the voice communication controller, the voice communication controller being further configured for generating a decoupling signal and for providing the decoupling signal to the second communication interface, said second communication interface being further configured for disconnecting the second communication link, thereby decoupling the second communication device from the automated call controller in response to said decoupling signal, said voice communication controller being further configured for generating a resetting signal and for providing the resetting signal to the voice signal dispatcher, said voice signal dispatcher being responsive to the resetting signal to delete all buffered audio signals.

18. The system of claim 1, wherein
the first communication interface is further configured for:
  receiving a system activation signal followed by the call initiation audio signal provided by the first communication device via the first communication link;

forwarding said received system activation signal to the voice communication controller; and forwarding said received call initiation audio signal to the voice utterance interpreter and to the voice signal dispatcher, said voice communication controller being responsive to said system activation signal to generate an utterance analyzing instruction signal and to provide said utterance analyzing instruction signal to the voice utterance interpreter, thereby instructing the voice utterance interpreter to begin analyzing of the call initiation audio signal, the voice utterance interpreter being responsive to said utterance analyzing instruction signal to begin analyzing the call initiation audio signal followed by the system activation signal.

19. A method for providing a call session in a communication environment between a first communication device associated with a caller user and a second communication device associated with a recipient user, the method comprising:

deploying a system for providing a call session in a communication environment, the system comprising an automated call controller adapted for being coupled to said first communication device via a first communication link and to said second communication device via a second communication link, said automated call controller storing a contact list of the caller user, said contact list including a set of recipient user records, each recipient user record including recipient user data indicative of recipient user personality characteristics, and coordinates of a corresponding communication device of the recipient user within the communication environment, the set of recipient user records being associated with all potential recipient users of the system associated with said caller user;

the method further comprising, in a forward direction from the first communication device to the second communication device:

coupling said first communication device to the automated call controller via the first communication link;

receiving a call initiation audio signal from said first communication device by the automated call controller, said call initiation audio signal being indicative of at least one call initiation phrase uttered by the caller user, said call initiation phrase being indicative of a caller user intention to establish said call session, said call initiation phrase including at least one personality characteristic of the recipient user;

analyzing said call initiation audio signal to determine said at least one personality characteristic of the recipient user;

finding the second device coordinates of the second communication device in the communication environment by using said at least one personality characteristic of the recipient user;

coupling the automated call controller to said second communication device via the second communication link in the communication environment by using the second device coordinates of the second communication device;

forwarding said call initiation audio signal to the second communication device;

the method further comprising, in a backward direction from the second communication device to the first communication device:

receiving a recipient user reaction signal from the second communication device by the automated call controller in response to said call initiation audio signal, said recipient user reaction signal being indicative of a recipient user intention selected from recipient acceptance intention and recipient rejection intention of the call session;

analyzing the recipient user reaction signal to determine indication of the recipient user intention;

if the recipient user intention is determined as an acceptance of the call session, establishing a full-duplex call session between the first and the second communication devices; and providing exchange of audio signals between the first and the second communication devices during said established call session, said audio signals being generated during a voice communication of the caller user and the recipient user;

wherein the analyzing of said call initiation audio signal includes:

extracting at least one call initiation phrase uttered by the caller user from said call initiation audio signal;

converting said at least one call initiation phrase to a text form;

performing syntactic analysis of said at least one call initiation phrase, in order to decompose said at least one call initiation phrase into corresponding phrase elements;

performing semantic interpretation of said phrase elements;

recognizing the caller user intention to establish a call session and determining said at least one personality characteristic of the recipient user from the semantically interpreted phrase elements; and generating a user intention data including of the at least one personality characteristic of the recipient user with whom the caller user intends to establish the call session.

20. The method of claim 19, wherein the receiving of the call initiation audio signal from said first communication device by the automated call controller includes buffering a copy of said call initiation audio signal.

21. The method of claim 19, wherein finding the second device coordinates of the second communication device includes:

finding a corresponding recipient user record within said contact list by using the at least one personality characteristic of the recipient user as a search parameter;

extracting the second device coordinates of the corresponding second communication device of the recipient user within the communication environment from the recipient user record.

22. The method of claim 19, wherein said recipient user reaction signal is selected from a recipient response audio signal and a recipient response action signal.

23. The method of claim 22, wherein said recipient response audio signal is indicative of at least one recipient user response phrase, said at least one recipient user response phrase being indicative of the recipient user intention to accept the call session, or to reject the call session.

24. The method of claim 23, wherein, in the backward direction from the second communication device to the first communication device, the receiving of the recipient response audio signal from the second communication device includes buffering a copy of said recipient response audio signal.

25. The method of claim 23, wherein the analyzing of said recipient response audio signal includes:
- extracting the at least one recipient user response phrase uttered by the recipient user from said recipient response audio signal;
- converting said at least one recipient user response phrase to a text form;
- performing syntactic analysis of the at least one recipient user response phrase, in order to decompose said at least one recipient user response phrase into corresponding phrase elements;
- performing semantic interpretation of said phrase elements;
- recognizing the recipient user intention either to accept or to reject the call session from the semantically interpreted phrase elements; and
- generating a user intention data indicative of said recipient user intention.

26. The method of claim 22, wherein the recipient user reaction signal is a recipient response action signal, said recipient response action signal being indicative of recipient user action pattern, said recipient user action pattern being indicative of a recipient user intention either to accept the call session, or to reject the call session.

27. A method for providing a call session in a communication environment between a first communication device associated with a caller user and a second communication device associated with a recipient user, the method comprising:
- deploying a system for providing a call session in a communication environment, the system comprising an automated call controller adapted for being coupled to said first communication device via a first communication link and to said second communication device via a second communication link, said automated call controller storing a contact list of the caller user, said contact list including a set of recipient user records, each recipient user record including recipient user data indicative of recipient user personality characteristics, and coordinates of a corresponding communication device of the recipient user within the communication environment, the set of recipient user records being associated with all potential recipient users of the system associated with said caller user;
- the method further comprising, in a forward direction from the first communication device to the second communication device:
  - coupling said first communication device to the automated call controller via the first communication link;
  - receiving a call initiation audio signal from said first communication device by the automated call controller, said call initiation audio signal being indicative of at least one call initiation phrase uttered by the caller user, said call initiation phrase being indicative of a caller user intention to establish said call session, said call initiation phrase including at least one personality characteristic of the recipient user;
  - analyzing said call initiation audio signal to determine said at least one personality characteristic of the recipient user;
  - finding the second device coordinates of the second communication device in the communication environment by using said at least one personality characteristic of the recipient user;
  - coupling the automated call controller to said second communication device via the second communication link in the communication environment by using the second device coordinates of the second communication device;
  - forwarding said call initiation audio signal to the second communication device;
- the method further comprising, in a backward direction from the second communication device to the first communication device:
  - receiving a recipient user reaction signal from the second communication device by the automated call controller in response to said call initiation audio signal, said recipient user reaction signal being indicative of a recipient user intention selected from recipient acceptance intention and recipient rejection intention of the call session;
  - analyzing the recipient user reaction signal to determine indication of the recipient user intention;
  - if the recipient user intention is determined as an acceptance of the call session, establishing a full-duplex call session between the first and the second communication devices; and providing exchange of audio signals between the first and the second communication devices during said established call session, said audio signals being generated during a voice communication of the caller user and the recipient user;
- the method further comprising, if the recipient user intention is determined as a rejection of the call session,
  - canceling a procedure of establishment of the full-duplex call session between the first and the second communication devices, the canceling of the establishment of the full-duplex call session including:
    - decoupling the second communication device from the automated call controller by disconnecting the second communication link; and
    - deleting the recipient user reaction signal.

28. The method of claim 19, further comprising:
- receiving a call termination signal from the first communication device via the first communication link, said call termination signal being indicative of the intention of the caller user to terminate the full-duplex call session established between the first and second communication devices; and
- in response to said call termination signal, terminating the established full-duplex call session; said terminating including:
  - interrupting exchange of the audio signals between the first communication device and the second communication device; and
  - decoupling the second communication device from the automated call controller by disconnecting the second communication link.

29. The method of claim 19, further comprising:
- receiving a call termination signal from the second communication device via the second communication link, said call termination signal being indicative of the intention of the recipient user to terminate the full-duplex call session established between the first and second communication devices; and
- in response to said call termination signal, terminating the established full-duplex call session; said terminating including:
  - interrupting exchange of the audio signals between the first communication device and the second communication device; and decoupling the second communication device from the automated call controller by disconnecting the second communication link.

\* \* \* \* \*